United States Patent Office 3,755,507
Patented Aug. 28, 1973

3,755,507
O,O-DIHYDROCARBYL-N-ALKYLTHIO- OR N-ARYLTHIO PHOSPHOROAMIDOTHIOATE
Melancthon S. Brown, deceased, by Gustave K. Kohn, administrator, Berkeley, Calif., assignor to Chevron Research Company, San Francisco, Calif.
No Drawing. Filed June 21, 1971, Ser. No. 155,292
Int. Cl. A01n 9/36; C07f 9/22, 9/24
U.S. Cl. 260—947       14 Claims

ABSTRACT OF THE DISCLOSURE

Compounds of the formula

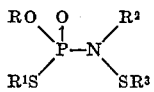

wherein R and R$^1$ are independently alkyl, alkenyl or alkynyl; R$^2$ is hydrogen, alkyl or —SR$^3$; and R$^3$ is alkyl optionally substituted with halogen atoms or aryl optionally substituted with alkyl groups or halogen atoms. The compounds are insecticides.

BACKGROUND OF THE INVENTION

Field

The present invention is directed to O-hydrocarbyl-S-hydrocarbyl-N-alkylthio- or N-arylthio phosphoroamidothioates and their use in the control of insects. More particularly the present invention is concerned with O-alkyl-S-alkyl-N-haloalkylthio- or N-arylthio phosphoroamidothioates.

Prior art

U.S. Pat. 3,309,266 discloses certain O-alkyl-S-alkyl phosphoroamidothioates and their use as insecticides. See also Netherlands Pat. 69/1926 directed to certain O-alkyl-S-alkyl phosphoroamidothionates. Also U.S. 3,511,-632 discloses certain N-substituted phosphoroamidothioates which are useful as herbicides.

DESCRIPTION OF THE INVENTION

The compounds of the present invention can be represented by the following formula

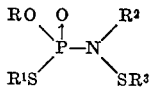

wherein R and R$^1$ are individually alkyl, alkenyl or alkynyl of 1 to 3 carbon atoms; R$^2$ is hydrogen, alkyl of 1 to 3 carbon atoms or —SR$^3$; and R$^3$ is alkyl of 1 to 4 carbon atoms substituted with 0 to 4 halogen atoms of atomic number 9 to 35 (fluorine, chlorine or bromine), or aryl of 6 to 12 carbon atoms substituted with 0 to 4 alkyl groups individually of 1 to 4 carbon atoms or halogen atoms of atomic number 9 to 35. Generally, the total number of substituents on the aryl group will not exceed 4. The R and R$^1$ groups may be the same or different. Of course, when R and R$^1$ are alkenyl or alkynyl, the minimum number of carbon atoms is 2.

Preferably, R and R$^1$ are alkyl of 1 to 3 carbon atoms, more preferably alkyl of 1 to 2 carbon atoms. Preferably R and R$^1$ will be the same.

Preferably, R$^2$ is hydrogen or —SR$^3$ wherein R$^3$ is aryl of 6 to 12 carbon atoms substituted with 0 to 4 alkyl groups individually of 1 to 4 carbon atoms or halogen atoms of atomic number 9 to 35.

Preferably, R$^3$ is alkyl of 1 to 2 carbon atoms, alkyl of 1 to 2 carbon atoms substituted with 1 to 4 halogen atoms of atomic number 9 to 35 or phenyl substituted with 0 to 2 alkyl groups of 1 to 4 carbon atoms or halogen atoms of atomic number 9 to 35. The most preferred R$^3$ groups will be halogenated alkyl groups such as halomethyl or haloethyl, particularly tetrachloroethyl or phenyl substituted with 0 to 1 alkyl group, preferably methyl or halogen atoms, preferably chlorine.

Representative radicals which R and R$^1$ may represent include methyl, ethyl, n-propyl, isopropyl, vinyl, allyl or propargyl.

Representative groups which R$^2$ may represent, in addition to hydrogen, include methyl, ethyl, n-propyl, isopropyl, tetrachloroethylthio, perchloromethylthio, dichloromethylthio, 1,2,2-trichloroethylthio, phenylthio, m-chlorophenylthio, p-chlorophenylthio, p-methylphenylthio, etc.

Representative groups which R$^3$ may represent include methyl, ethyl, n-propyl, isopropyl, butyl, 1-chloroethyl, 2,2-dichloroethyl, 1,2,2-trichloroethyl, 1,2,2,3-tetrachloropropyl, 1,1,2,2 - tetrachloroethyl, fluorodichloromethyl, bromodichloromethyl, 1,1-dichloro-2,2-dibromoethyl, 1,1-dichloro-2,2-difluoroethyl, phenyl, naphthyl, p-butylphenyl, p-methylphenyl, o-methylphenyl, o,p-dimethylphenyl, p - chlorophenyl, m - bromophenyl, o - fluorophenyl, 2-chloro - 4 - methylphenyl, 2,4,6-trichlorophenyl, o-ethylphenyl, p-propylphenyl, etc.

Representative compounds of the present invention include

O,S-dimethyl-N-methylthiophosphoroamidothioate,
O,S-dimethyl-N-ethylthiophosphoroamidothioate,
O,S-dimethyl-N-propylthiophosphoroamidothioate,
O,S-dimethyl-N-trichloromethylthiophosphoroamidothioate,
O,S-dimethyl-N-1,2,2,2-tetrachloroethylthiophosphoroamidothioate,
O,S-dimethyl-N-1,1,2,2-tetrachloroethylthiophosphoroamidothioate,
O-methyl-S-ethyl-N-1,1,2,2-tetrachloroethylthiophosphoroamidothioate,
O-ethyl-S-methyl-N-1,1,2,2-tetrachloroethylthiophosphoroamidothioate,
O-methyl-S-allyl-N-1,1,2,2-tetrachloroethylthiophosphoroamidothioate,
O-methyl-S-propargyl-N-1,2,2,2-tetrachloroethylthiophosphoroamidothioate,
O,S-dimethyl-N-1,1,2,2-tetrachloropropylthiophosphoroamidothioate,
O-methyl-S-propyl-N-1,2,2-trichloroethylthiophosphoroamidothioate,
O-methyl-S-ethyl-N-phenylthiophosphoroamidothioate,
O,S-dimethyl-N-4-chlorophenylthiophosphoroamidothioate,
O,S-dimethyl-N-3,4-dichlorophenylthiophosphoroamidothioate,
O,S-dimethyl-N-2,4-dichlorophenylthiophosphoroamidothioate,
O,S-dimethyl-N-2-fluorophenylthiophosphoroamidothioate,
O,S-dimethyl-N-3-methylphenylthiophosphoroamidothioate,
O,S-diallyl-N-trichloromethylthiophosphoroamidothioate,
O,S-diethyl-N-1,1,2,2-tetrachloroethylthiophosphoroamidothioate,
O,S-dipropargyl-N-4-chlorophenylthiophosphoroamidothioate,
O-ethyl-S-methyl-N-2-chloro-4-bromophenylthiophosphoroamidothioate,
O,O-dimethyl-N-2,4,6-tribromophenylthiophosphoroamidothioate,
O,S-dimethyl-N-3-fluoro-4-methylphenylthiophosphoroamidothioate,
O-methyl-S-ethyl-N-1-bromo-2,2,2,-trichloroethylthiophosphoroamidothioate, O-ethyl-S-methyl-N-1,1-dichloro-2,2-dibromoethylthiophosphoroamidothioate,
O-allyl-S-methyl-N-4-chlorophenylthiophosphoroamidothioate,
O,S-dipropargyl-N-1,1,2,2-tetrachloroethylthiophosphoroamidothioate,
O,S-diallyl-N-phenylthiophosphoroamidothioate,
O,S-diethyl-N-phenylthiophosphoroamidothioate,
O,S-diallyl-N-2-chlorophenylthiophosphoroamidothioate,
O,S-diallyl-N-4-butylphenylthiophosphoroamidothioate,
O,S-dimethyl-N-2,4-diethylphenylthiophosphoroamidothioate,
O,S-diethyl-N-2,3-dimethylphenylthiophosphoroamidothioate,
O-allyl-S-propargyl-N-2-methyl-4-bromophenylthiophosphoroamidothioate,
O-methyl-S-propargyl-N-2-fluoro-4-methylphenylthiophosphoroamidothioate,
O,S-diisopropyl-N-trichloroethylthiophosphoroamidothioate,
O,S-dimethyl-N,N-di-trichloromethylthiophosphoroamidothioate,
O,S-dimethyl-N,N-di-trichlorophenylthiophosphoroamidothioate,
O,S-dimethyl-N,N-di-1,1,2,2-tetrachloroethylthiophosphoroamidothioate,
O,S-dimethyl-N,N-di-4-chlorophenylthiophosphoroamidothioate,
O,S-dimethyl-N,N-di-2,4-dichlorophenylthiophosphoroamidothioate,
O-allyl-S-methyl-N,N-di-4-bromophenylthiophosphoroamidothioate,
O-propargyl-S-methyl-N,N-di-2,4-difluorophenylthiophosphoroamidothioate,
O-ethyl-S-methyl-N,N-di-3,4-di-chlorophenylthiophosphoroamidothioate,
O,S-dimethyl-N-trichloromethylthio-N-4-chlorophenylthiophosphoroamidothioate,
O,S-dimethyl-N-ethylthio-N-phenylthiophosphoroamidothioate,
O,S-dimethyl-N-methyl-N-1,1,2,2-tetrachloroethylthiophosphoroamidothioate,
O-methyl-S-allyl-N-trichloromethylthio-N-4-chloromethylthiophosphoroamidothioate,
O-methyl-S-propyl-N-1-bromo-2,2,2-trichloroethylthio-N-1,1,2,2-tetrachloroethylthiophosphoroamidothioate,
O-methyl-S-allyl-N-1-bromo-2,2,2-trichloroethylthio-N-2-fluorophenylthiophosphoroamidothioate,
O,S-diallyl-N,N-diphenylthiophosphoroamidothioate,
O,S-dimethyl-N,N-di-4-methylphenylthiophosphoroamidothioate, etc.

The compounds of the present invention in which $R^2$ is hydrogen or an alkyl of 1 to 3 carbon atoms are prepared by the reaction of an appropriate O-hydrocarbyl-S-hydrocarbyl phosphoroamidothioate with a sulfenyl chloride according to the following reaction:

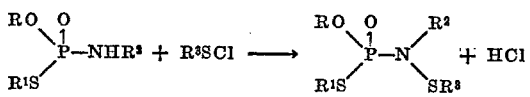

wherein R, $R^1$ and $R^3$ are as described above and $R^2$ is hydrogen or alkyl of 1 to 3 carbon atoms. In this process, a molar amount, or slight excess of the sulfenyl chloride compound is reacted with a molar amount of the phosphoroamidothioate. The reaction is carried out in a solvent, such as dimethyl formamide or dioxane. The quantity of solvent in weight varies from 2 to 10 times the combined weight of the reactants. At least a molar equivalent of a base is included to remove the HCl as formed. Suitable bases include triethylamine, pyridine, quinuclidine and N-methylmorpholine.

The reactants in reaction (I) above are mixed at temperatures in the range of 0 to 150° C. The reaction is exothermic and after mixing it is desirable to maintain the temperature within the range of 0 to 35° C., preferably 0 to 25° C., by external cooling, by mixing slowly, or both. Generally the reaction time is from 10 to 120 minutes after the reactants have been combined.

To prepare compounds of the present invention wherein $R^2$ is —$SR^3$ the mono-substituted amide is prepared according to reaction (I) above wherein $R^2$ is hydrogen, and then the reaction product is reacted with a second mole of an appropriate sulfenyl chloride to give the desired diamide according to the following equation:

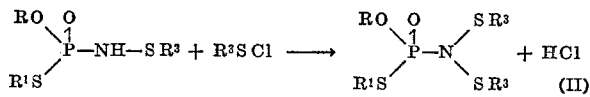

wherein R, $R^1$ and $R^3$ are as defined previously; and two $R^3$'s may be the same or different. The reaction conditions for reaction (II) are the same as for the first step described above, reaction (I). Of course, when preparing the diamide having two —$SR^3$ groups attached to the nitrogen and where the $R^3$'s are the same, the appropriate O-hydrocarbyl-S-hydrocarbyl phosphoroamidothioate can be reacted with 2 moles of an appropriate sulfenyl chloride in the presence of two or more equivalents of base.

In all of the above reactions the product can be recovered by diluting the reaction mixture with a large excess of ice water and then extracting with a water insoluble organic solvent such as diethyl ether or chloroform. The extract is then dried and evaporated to give the crude product. This crude product can be used as such or can be further purified by chromatography or crystallization. The preferred solvents for crystallization are mixtures of benzene and hexane.

The present invention can be more fully understood by reference to the following examples.

EXAMPLE 1

Preparation of O,S-dimethyl-N-4-chlorophenylthiophosphoroamidothioate

To an ice-cold solution of 10 g. (0.071 mole) of O,S-dimethyl phosphoroamidothioate dissolved in 50 ml. of dimethylformamide containing 6 g. (0.076 mole) of pyridine there was slowly added 13 g. (0.073 mole) of 4-chlorophenylsulfenyl chloride. The resulting mixture was stirred for 1½ hours as the temperature was slowly increased from 0 to 25° C. At the end of this time, the reaction mixture was combined with 250 ml. of ether and then washed with 250 ml. of water, 250 ml. of dilute salt water, and with 100 ml. of saturated salt water. The ether solution was dried and then evaporated under vacuum. As the ether was being removed, the crude product precipitated, and was removed by filtration. The product, after crystallization from a benzene/hexane mixture, weighed 6 g. and had a melting point of 99–102° C. Analysis was as follows: Calcd. (percent): S, 22.6; Cl, 12.5; P, 10.9. Found (percent): S, 21.8; Cl, 13.3; P, 11.2.

The infrared spectra had strong adsorption bands at : 6.8, 7.2, 8.2, 9.65, 10.55 and 12.15 microns.

EXAMPLE 2

Preparation of O,S-dimethyl-N,N-di-4-chlorophenylthiophosphoroamidothioate 10 g. (0.035 mole) of O,S-dimethyl-N-4-chlorophenylthiophosphoroamidothioate, prepared as in Example 1, was dissolved in 50 ml. of diethyl formamide containing 2 g. (0.018 mole) of 1,4-diazabicyclo[2,2,2]octane. This solution was cooled in an ice-bath and then 7 g. (0.039 mole) of 4-chlorophenylsulfenyl chloride was added slowly. When all had been added, the ice-bath was removed and the mixture was stirred at ambient temperature for 1 hour. At the end of this time 500 ml. of ice water was added. The resulting mixture was extracted with three 250 ml. portions of diethyl ether. The ether extracts were combined, washed with salt water and then dried. The ether solvent was removed by evaporation under vacuum to give the crude product. The crude product was dissolved in a mixture of 10 ml. of benzene and 50 ml. of hexane. The resulting solution was added to a silica gel packed chromatography column and eluted with a 1:4 solution of chloroform:diethyl ether. The product was an oily liquid. Analysis was as follows: Calcd. (percent): S, 22.6; Cl, 16.6. Found (percent): S, 22.1; Cl, 18.2.

The infrared spectra had strong adsorption bands at: 6.8, 8.0, 9.15, 9.7–9.9, 10.9 and 12.1–12.3 microns.

Other compounds of the present invention were prepared by the procedures described above and are tabulated in Table I.

will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The following tests were conducted with compounds of the present invention to show their insecticidal activity. The test results are reported in Table II.

Test procedures

Houseflies (*Musca domestica* L.): A 500 p.p.m. acetone solution of the candidate toxicant was placed in a microsprayer (atomizer). A random mixture of anesthetized male and female flies was placed in a container and 55

TABLE I

| Compound | Elemental analysis, percent | | | | | | | | M.P. (° C.) |
|---|---|---|---|---|---|---|---|---|---|
| | S | | N | | P | | Cl | | |
| | Calc. | Found | Calc. | Found | Calc. | Found | Calc. | Found | |
| O,S-dimethyl-N-4-methylphenylthiophosphoroamidothioate | 24.4 | 23.3 | 5.3 | 4.9 | | | | | 94–97 |
| O,S-dimethyl-N-phenylthiophosphoroamidothioate | 25.7 | 25.4 | | | 12.4 | 12.3 | | | 69–72 |
| O,S-dimethyl-N-1,1,2,2-tetrachloroethylthiophosphoroamidothioate | 18.9 | 18.7 | | | | | 42.8 | 41.7 | 140–142 |
| O,S-diethyl-N-4-chlorophenylthiophosphoroamidothioate | 20.5 | 20.4 | | | | | 11.4 | 11.5 | Oil |
| O,S-dimethyl-N,N-di-4-methylphenylthiophosphoroamidothioate | 25.0 | 24.4 | | | 8.1 | 7.5 | | | 58–61 |

The compounds of the present invention find use as insecticides. The term "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spider, mites, ticks, centipedes, worms and the like.

The compounds of the present invention may be applied in either liquid or solid formulations to the insects, their environment or hosts susceptible to insect attack. For example, they may be sprayed or otherwise applied directly to plants or soil so as to effect control of insects coming into contact therewith.

Formulations of the compounds of this invention will comprise a toxic amount of one or more of the compounds and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular compound which is used, the carrier in or upon which it is incorporated, the method and conditions of application, the insect species to be controlled, etc., the proper consideration of these factors being within the skill of those versed in the art. In general, the toxic ingredients of this invention mg. of the above-described acetone solution was sprayed on them. A lid was placed on the container. A mortality reading was made after 24 hours.

Aphids (*Aphis gossypii* Glover): An acetone solution of the candidate toxicant containing a small amount of nonionic emulsifier was diluted with water to 30 p.p.m. Cucumber leaves infested with the cotton aphids were dipped in the toxicant solution. Mortality readings were then taken after 24 hours.

Two-spotted mites (*Tetramuchus urticae*): An acetone solution of the candidate toxicant containing a small amount of nonionic emulsifier was diluted with water to 100 p.p.m. Pinto bean leaves which were infested with mites were dipped in the toxicant solution. Mortality readings were taken after 24 hours.

Cabbage looper (*Trichopulsia ni*): An acetone solution of the candidate toxicant containing a small amount of nonionic emulsifier was diluted with water to 500 p.p.m. Cucumber leaf sections were dipped in the toxicant solution and dried. The sections were then infested with cabbage looper larvae. Mortality readings were taken after 24 hours.

Two-spotted mites (*Tetramuchus urticae*): Systemic evaluation: An acetone solution of the candidate toxicant containing a nonionic emulsifier was diluted with water to give 500 p.p.m. solution. The solution was poured around pinto bean plants at a rate of 225 micrograms per cm.² surface area of the soil around the plants. Two replicates were used. The plants were not watered for 24 hours and then were watered daily. 48 hours after treatment with the candidate toxicant the plants were infested with mites. The percent control based on the mortality of the mites was determined.

TABLE II

| Compound | Percent mortality | | | | |
|---|---|---|---|---|---|
| | Houseflies | Aphids | Mites | Cabbage looper | Systemic evaluation mites |
| O,S-dimethyl-N-4-chlorophenylthiophosphoroamidothioate | | 100 | 60 | | 100 |
| O,S-dimethyl-N,N-di-4-chlorophenylthiophosphoroamidothioate | 100 | 95 | 100 | 78 | 100 |
| O,S-dimethyl-N-4-methylphenylthiophosphoroamidothioate | | 100 | 99 | | 100 |
| O,S-dimethyl-N-phenylthiophosphoroamidothioate | 100 | 100 | 100 | 100 | 100 |
| O,S-dimethyl-N-1,1,2,2-tetrachloroethylthiophosphoroamidothioate | 100 | 98 | 99 | 100 | 100 |
| O,S-diethyl-N-4-chlorophenylthiophosphoroamidothioate | 90 | 100 | 78 | | 100 |
| O,S-dimethyl-N,N-di-4-methylphenylthiophosphoroamidothioate | 100 | 100 | 100 | 78 | 100 |

As will be evident to those skilled in the art, various modifications on this invention can be made or followed, in the light of the foregoing disclosure and discussion, without departing from the spirit or scope of the disclosure or from the scope of the following claims.

What is claimed is:

1. Compound of the formula

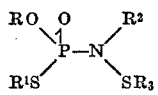

wherein R and $R^1$ are individually alkyl, alkenyl or alkynyl of up to 3 carbon atoms; $R^2$ is hydrogen, alkyl of 1 to 3 carbon atoms or —$SR^3$ and $R^3$ is alkyl of 1 to 4 carbon atoms substituted with 0 to 4 halogen atoms of atomic number 9 to 35 or aryl of 6 to 12 carbon atoms substituted with 0 to 4 alkyl groups individually of 1 to 4 carbon atoms or halogen atoms of atomic number 9 to 35.

2. Compound of claim 1 wherein R and $R^1$ are alkyl of 1 to 3 carbon atoms.

3. Compound of claim 1 wherein $R^2$ is hydrogen or —$SR^3$ and wherein $R^3$ is aryl of 6 to 12 carbon atoms substituted with 0 to 4 alkyl groups individually of 1 to 4 carbon atoms or halogen atoms of atomic number 9 to 35.

4. Compound of claim 1 wherein $R^3$ is alkyl of 1 to 2 carbon atoms, alkyl of 1 to 2 carbon atoms substituted with 1 to 4 halogen atoms of atomic number 9 to 35 or phenyl substituted with 0 to 2 alkyl groups of 1 to 4 carbon atoms or halogen atoms of atomic number 9 to 35.

5. Compound of claim 1 wherein $R^3$ is alkyl of 1 to 2 carbon atoms substituted with 1 to 4 halogen atoms of atomic number 9 to 35 or phenyl substituted with 0 to 1 alkyl group of 1 to 4 carbon atoms or halogen atoms of atomic number 9 to 35.

6. Compound of claim 1 wherein R and $R^1$ are individually alkyl of 1 to 2 carbon atoms; $R^2$ is hydrogen and $R^3$ is tetrachloroethyl or phenyl substituted with 0 to 1 methyl group or chlorine atom.

7. Compound of claim 1 wherein R and $R^1$ are the same and are methyl or ethyl; $R^2$ is hydrogen or —$SR^3$ and $R^3$ is tetrachloroethyl or phenyl substituted with 0 to 1 alkyl group of 1 to 4 carbon atoms or halogen atoms of atomic number 9 to 35.

8. The compound of claim 7 being O,S-dimethyl-N-4-chlorophenylthiophosphoroamidothioate.

9. The compounds of claim 7 being O,S-dimethyl-N,N-di-4-chlorophenylthiophosphoroamidothioate.

10. The compound of claim 7 being O,S-dimethyl-N-4-methylphenylthiophosphoroamidothioate.

11. The compound of claim 7 being O,S-dimethyl-N-phenylthiophosphoroamidothioate.

12. The compound of claim 7 being O,S-dimethyl-N-1,1,2,2-tetrachloroethylthiophosphoroamidothioate.

13. The compound of claim 7 being O,S-diethyl-N-4-chlorophenylthiophosphoroamidothioate.

14. The compound of claim 7 being O,S-dimethyl-N,N-di-4-methylphenylthiophosphoroamidothioate.

References Cited
UNITED STATES PATENTS

| | | | |
|---|---|---|---|
| 2,957,020 | 10/1960 | Perkow | 260—959 X |
| 2,971,020 | 2/1961 | Schrader | 260—959 X |
| 3,309,266 | 3/1967 | Magee | 424—220 |

LEWIS GOTTS, Primary Examiner

R. L. RAYMOND, Assistant Examiner

U.S. Cl. X.R.

260—959, 968; 424—215